United States Patent
Jao et al.

(10) Patent No.: US 7,632,788 B2
(45) Date of Patent: Dec. 15, 2009

(54) NANOSPHERE ADDITIVES AND LUBRICANT FORMULATIONS CONTAINING THE NANOSPHERE ADDITIVES

(75) Inventors: Tze-Chi Jao, Glen Allen, VA (US); Mark T. Devlin, Richmond, VA (US)

(73) Assignee: Afton Chemical Corporation

( * ) Notice: Subject to any disclaimer, the term of this patent is extended or adjusted under 35 U.S.C. 154(b) by 621 days.

(21) Appl. No.: 11/301,229

(22) Filed: Dec. 12, 2005

(65) Prior Publication Data

US 2007/0135317 A1 Jun. 14, 2007

(51) Int. Cl.
*C10L 1/24* (2006.01)
*C10M 135/10* (2006.01)

(52) U.S. Cl. ..................................... 508/410
(58) Field of Classification Search ................. 508/118, 508/264, 410, 469
See application file for complete search history.

(56) References Cited

U.S. PATENT DOCUMENTS

| | | | |
|---|---|---|---|
| 2,384,577 A | 9/1945 | Thomas | |
| 2,710,872 A | 6/1955 | Thompson | |
| 2,786,866 A | 3/1957 | Hook et al. | |
| 2,897,152 A | 7/1959 | Elliot et al. | |
| 3,219,666 A | 11/1965 | Norman et al. | |
| 3,356,702 A | 12/1967 | Farmer et al. | |
| 3,407,222 A | 10/1968 | Lies | |
| 3,509,051 A | 4/1970 | Farmer et al. | |
| 3,565,804 A | 2/1971 | Honnen et al. | |
| 3,697,574 A | 10/1972 | Piasek et al. | |
| 3,736,357 A | 5/1973 | Piasek et al. | |
| 3,794,081 A | 2/1974 | Fiser et al. | |
| 3,816,314 A | 6/1974 | Pappas et al. | |
| 3,867,359 A | 2/1975 | Beadle | |
| 4,029,587 A | 6/1977 | Koch | |
| 4,164,473 A | 8/1979 | Coupland et al. | |
| 4,178,258 A | 12/1979 | Papay et al. | |
| 4,234,435 A | 11/1980 | Meinhardt et al. | |
| 4,259,195 A | 3/1981 | King et al. | |

(Continued)

FOREIGN PATENT DOCUMENTS

CA 2392727 6/2001

(Continued)

OTHER PUBLICATIONS

Zheng, R. et al: Polymer Nano- and Microspheres with Bumpy and Chain-Segregated Surfaces. In J. Am. Chem. Soc., 2005, 127, pp. 15358-15359.

(Continued)

*Primary Examiner*—Walter D Griffin
*Assistant Examiner*—Frank C Campanell
(74) *Attorney, Agent, or Firm*—Luedeka, Neely & Graham, P.C.

(57) ABSTRACT

A method for reducing friction coefficients and wear between lubricated surfaces. The method includes providing an amount of an oil-soluble nanospherical component derived from a photo-crosslinkable poly(2-cinnamoyloxyalkyl acrylate) core and a diblock acrylate copolymer corona in a fully formulated lubricant composition containing a base oil of lubricating viscosity. The nanospherical component has a core diameter ranging from about 10 to about 100 nanometers. The lubricant composition containing the nanospherical component is applied to a surface to be lubricated.

25 Claims, 3 Drawing Sheets

U.S. PATENT DOCUMENTS

| | | | |
|---|---|---|---|
| 4,261,843 A | 4/1981 | King et al. |
| 4,263,152 A | 4/1981 | King et al. |
| 4,265,773 A | 5/1981 | deVries et al. |
| 4,266,945 A | 5/1981 | Karn |
| 4,272,387 A | 6/1981 | King et al. |
| 4,283,295 A | 8/1981 | deVries et al. |
| 4,285,822 A | 8/1981 | deVries et al. |
| 4,362,633 A | 12/1982 | Spence et al. |
| 4,369,119 A | 1/1983 | deVries et al. |
| 4,395,343 A | 7/1983 | deVries et al. |
| 4,402,840 A | 9/1983 | deVries et al. |
| 4,466,901 A | 8/1984 | Hunt et al. |
| 4,636,322 A | 1/1987 | Nalesnik |
| 4,692,256 A | 9/1987 | Umemura et al. |
| 4,758,362 A | 7/1988 | Butke |
| 4,765,918 A | 8/1988 | Love et al. |
| 4,867,890 A | 9/1989 | Colclough et al. |
| 4,876,375 A | 10/1989 | Lam |
| 4,885,365 A | 12/1989 | Lam |
| 4,889,647 A | 12/1989 | Rowan et al. |
| 4,904,401 A | 2/1990 | Ripple et al. |
| 4,927,552 A | 5/1990 | Lam |
| 4,957,643 A | 9/1990 | Lam |
| 4,957,649 A | 9/1990 | Ripple et al. |
| 4,966,719 A | 10/1990 | Coyle et al. |
| 4,978,464 A | 12/1990 | Coyle et al. |
| 4,990,271 A | 2/1991 | Francis |
| 4,995,996 A | 2/1991 | Coyle et al. |
| 5,011,504 A | 4/1991 | Henry et al. |
| 5,137,647 A | 8/1992 | Karol |
| 5,204,012 A | 4/1993 | Schaffhausen |
| 5,412,130 A | 5/1995 | Karol |
| 5,627,259 A | 5/1997 | Thaler |
| 5,633,326 A | 5/1997 | Patil et al. |
| 5,643,859 A | 7/1997 | Gutierrez et al. |
| 5,686,397 A | 11/1997 | Baranski et al. |
| 5,693,598 A | 12/1997 | Abraham et al. |
| 5,789,357 A | 8/1998 | Baranski et al. |
| 5,792,729 A | 8/1998 | Harrison et al. |
| 5,851,965 A | 12/1998 | Harrison et al. |
| 5,853,434 A | 12/1998 | Harrison et al. |
| 5,902,776 A | 5/1999 | Dohner et al. |
| 5,936,041 A | 8/1999 | Diana et al. |
| 6,034,040 A | 3/2000 | Ozbalik et al. |
| 6,114,288 A | 9/2000 | Fujitsu et al. |
| 6,117,826 A | 9/2000 | Baranski et al. |
| 6,232,276 B1 | 5/2001 | Stiefel et al. |
| 6,509,303 B1 | 1/2003 | Gatto |
| 6,528,463 B1 | 3/2003 | Gatto et al. |
| 6,723,685 B2 | 4/2004 | Hartley et al. |
| 6,797,677 B2 | 9/2004 | Esche, Jr. et al. |
| 6,872,785 B2 | 3/2005 | Wang et al. |
| 2004/0266630 A1 | 12/2004 | George et al. |
| 2005/0119134 A1 | 6/2005 | Tequi et al. |
| 2005/0197443 A1 | 9/2005 | Ziser et al. |
| 2006/0189490 A1 | 8/2006 | Dardin |
| 2006/0252858 A1 | 11/2006 | Obrecht et al. |
| 2006/0275690 A1 | 12/2006 | Fessenbecker |
| 2006/0275691 A1 | 12/2006 | Fessenbecker et al. |
| 2007/0254820 A1* | 11/2007 | Jao et al. .......... 508/469 |
| 2008/0064768 A1 | 3/2008 | Ziser et al. |
| 2008/0280793 A1 | 11/2008 | Tequi et al. |

FOREIGN PATENT DOCUMENTS

| | | |
|---|---|---|
| DE | 19934182 | 1/2001 |
| DE | 19934182 A1 | 1/2001 |
| DE | 10314776 | 10/2004 |
| EP | 0265254 | 4/1988 |
| EP | 330522 B1 | 8/1989 |
| GB | 2329905 | 4/1999 |
| JP | 2000-247935 | 9/2000 |
| JP | 2004-256414 | 9/2004 |
| JP | 2005-041934 | 2/2005 |
| WO | 0140339 | 6/2001 |
| WO | 2005056739 | 6/2005 |
| WO | 2007068102 | 6/2007 |

OTHER PUBLICATIONS

Liu, G. et al: End Coupling of Block Copolymer Nanotubes to Nanospheres. In J. Am. Chem. Soc., 2003, 125, pp. 14039-14045.

Hu, J. et al: Chain Mixing and Segregation in B-C and C-D Diblock Copolymer Micelles. In Macromolecules, 2005, 38, 8058-8065.

* cited by examiner

NANOSPHERE ADDITIVES AND LUBRICANT FORMULATIONS CONTAINING THE NANOSPHERE ADDITIVES

TECHNICAL FIELD

The embodiments described herein relate to methods for friction modification and wear reduction using fully formulated lubricants containing nanoparticles. In particular, oil-soluble nanospherical components are used in lubricant formulations to reduce friction coefficients thereof and as wear reducing agents therefor.

BACKGROUND AND SUMMARY

A lubricant may be a liquid, a paste, or a solid with liquid lubricants being the most used. Lubricating oils may be used in automobile engines, transmissions, bearings, gears, industrial gears and other machinery to reduce friction and wear and to increase fuel economy. A number of components including, but not limited to dispersants, detergents, friction modifiers, antiwear agents, antioxidants, and anti-corrosion additives are typically present in fully formulated lubricating oils. For many lubricant applications, a viscosity index improver may also be included as a major component.

With the energy resources depleting and more stringent environmental regulations being adopted, there exists a greater demand to increase a fuel economy of vehicles and to decrease emissions in vehicle exhausts. Currently, organic friction modifiers are added to the lubricating oils to increase fuel economy. However, the level of the fuel economy achievable by organic friction modifiers is limited. Hence, there is a need for alternate methods for achieving improvements in fuel economy.

One method for increasing fuel economy is to provide lower viscosity grade lubricating oils. While providing lower viscosity lubricating oils may dramatically increase fuel economy, such lubricating oils may also increase wear. Wear may be partially reduced by using antiwear agents such as zinc dialkyldithiolphosphate (ZDTP). However, ZDTP contains phosphorus and its decomposition products may have deleterious effects on automotive catalyst systems for emission control. Accordingly, there remains an increasing need for methods for reducing friction and wear without adversely affecting emission control systems and without further depleting scarce natural resources.

With regard to the above, exemplary embodiments described herein provide methods for reducing friction coefficients and wear between lubricated surfaces. The method includes providing an amount of an oil-soluble nanospherical component derived from a photo-crosslinkable poly(2-cinnamoyloxyalkyl acrylate) core and a diblock acrylate copolymer corona in a fully formulated lubricant composition containing a base oil of lubricating viscosity. The nanospherical component has a core diameter ranging from about 10 to about 100 nanometers. According to the method, the lubricant composition containing the nanospherical component is applied to a surface to be lubricated.

In another embodiment, there is provided a method of reducing a friction coefficient of an engine lubricant composition during operation of an engine containing the lubricant composition. The method includes contacting the engine parts with a fully formulated lubricant composition having a base oil of lubricating viscosity and an amount of an oil-soluble nanospherical component derived from a photo-crosslinkable poly(2-cinnamoyloxyalkyl acrylate) core and a diblock acrylate copolymer corona sufficient to reduce the friction coefficient to below a friction coefficient of a lubricant composition devoid of the oil-soluble nanopherical component. The nanospherical component has a core diameter ranging from about 10 to about 100 nanometers.

A further embodiment of the disclosure provides a method for reducing wear between moving parts using a lubricating oil. The method includes using as the lubricating oil for one or more moving parts a lubricant composition containing a base oil, and an oil additive package including a wear reducing agent. The wear reducing agent is an oil-soluble nanospherical component derived from a photo-crosslinkable poly(2-cinnamoyloxyalkyl acrylate) core and a diblock acrylate copolymer corona.

A further embodiment of the disclosure provides a method for reducing a friction coefficient adjacent a lubricated surface, comprising providing an amount of an oil-soluble nanospherical component derived from a photo-crosslinkable poly(2-cinnamoyloxyalkyl acrylate) core and a diblock acrylate copolymer corona in a fully formulated lubricant composition containing a base oil of lubricating viscosity, and applying the lubricant composition containing the nanospherical component to a surface to be lubricated, wherein the nanospherical component has a core diameter greater than the film thickness of the lubricant composition.

A further embodiment of the disclosure provides a method of reducing a friction coefficient of an engine lubricant composition during operation of an engine containing the lubricant composition, comprising contacting the engine parts with a fully formulated lubricant composition comprising a base oil of lubricating viscosity and an amount of an oil-soluble nanospherical component derived from a photo-crosslinkable poly(2-cinnamoyloxyalkyl acrylate) core and a diblock acrylate copolymer corona sufficient to reduce the friction coefficient to below a friction coefficient of a lubricant composition devoid of the oil-soluble nanospherical component, wherein the nanospherical component has a core diameter greater than the film thickness of the lubricant composition.

As set forth briefly above, embodiments of the disclosure provide unique finished lubricant compositions that may significantly improve the coefficient of friction of the lubricant composition and may reduce wear for relatively low viscosity lubricant compositions. An additive package containing the oil-soluble nanospherical component may be mixed with an oleaginous fluid that is applied to a surface between moving parts. In other applications, an additive package containing the oil-soluble nanospherical component may be provided in a fully formulated lubricant composition.

The methods described herein are particularly suitable for reducing contamination of pollution control devices on motor vehicles or, in the alternative, the compositions are suitable for improving the friction coefficient characteristics and wear properties of lubricant formulations. Unlike fullerenes and inorganic nanoparticles, the nanospherical components described herein enable better particle size and shape control, which may be beneficial for enhancing lubricant effectiveness. Other features and advantages of the methods described herein may be evident by reference to the following detailed description which is intended to exemplify aspects of the exemplary embodiments without intending to limit the embodiments described herein.

It is to be understood that both the foregoing general description and the following detailed description are exemplary and explanatory only and are intended to provide further explanation of the embodiments disclosed and claimed.

BRIEF DESCRIPTION OF THE DRAWINGS

Further advantages of the embodiments will become apparent by reference to the detailed description of preferred embodiments when considered in conjunction with the drawings, wherein like reference characters designate like or similar elements throughout the several drawings as follows.

DETAILED DESCRIPTION OF EMBODIMENTS

For the purposes of this disclosure, the terms "hydrocarbon soluble," "oil soluble," or "dispersable" are not intended to indicate that the compounds are soluble, dissolvable, miscible, or capable of being suspended in a hydrocarbon compound or oil in all proportions. These do mean, however, that they are, for instance, soluble or stably dispersible in oil to an extent sufficient to exert their intended effect in the environment in which the oil is employed. Moreover, the additional incorporation of other additives may also permit incorporation of higher levels of a particular additive, if desired.

As used herein, "hydrocarbon" means any of a vast number of compounds containing carbon, hydrogen, and/or oxygen in various combinations. The term "hydrocarbyl" refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of the description herein, do not alter the predominantly hydrocarbon substituent (e.g., halo (especially chloro and fluoro), hydroxy, alkoxy, mercapto, alkylmercapto, nitro, nitroso, and sulfoxy);

(3) hetero-substituents, that is, substituents which, while having a predominantly hydrocarbon character, in the context of this description, contain other than carbon in a ring or chain otherwise composed of carbon atoms. Hetero-atoms include sulfur, oxygen, nitrogen, and encompass substituents such as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

Figure 1:
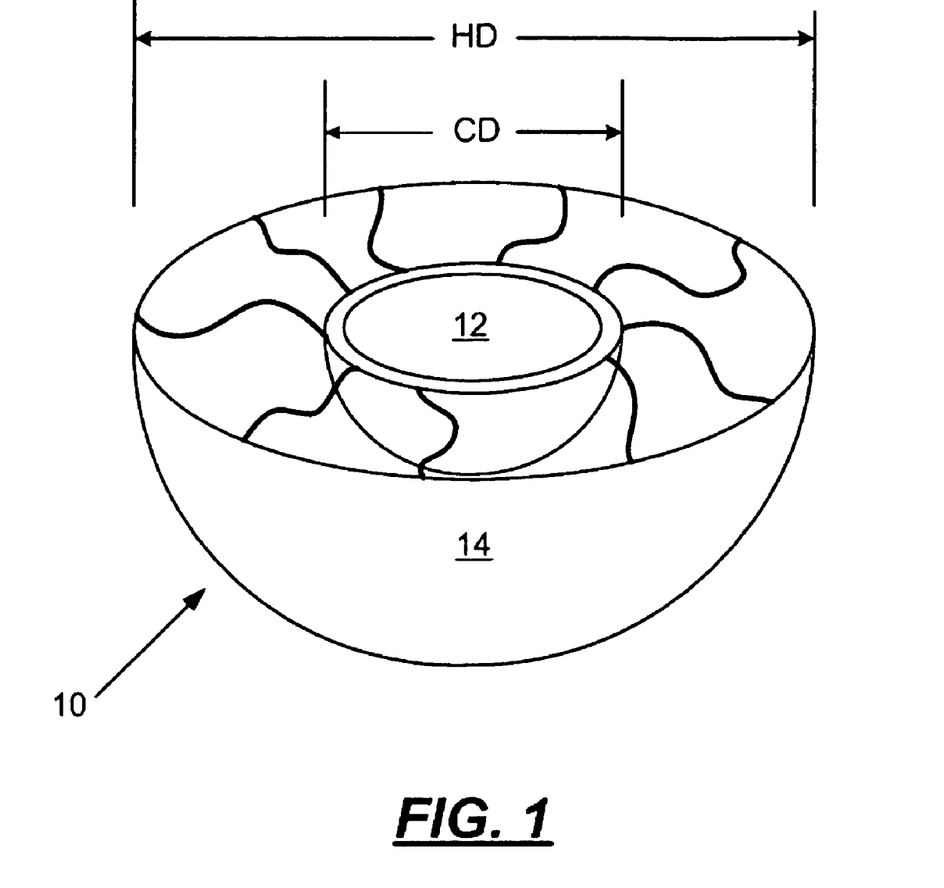
FIG. 1 is a schematic drawing, not to scale, of a nanosphere according to the disclosure.

The nanospherical component 10, illustrated in FIG. 1, includes a substantially oil-insoluble core 12 and an oil-soluble corona 14 attached to the core. The core 12 of the nanospherical component is derived from a photo-crosslinkable poly(2-cinnamoyloxyalkyl acrylate) or PCAA block made by reacting hydroxyl groups of poly(hydroxylalkyl acrylate) or PHAA with cinnamoyl chloride. The glass transition temperature of the core 12 may be adjusted by reacting a fraction of the hydroxyalkyl acrylate with otanoyl chloride to provide poly[(2-cinnamoyloxyalkyl acrylate)-ran-(2-octanoyloxyalkyl acrylate)] or such as poly[(2-cinnamoyloxyethyl acrylate)-ran-(2-octanoyloxyethyl acrylate)] or P(CEA-r-OEA) illustrated by the following formula:

wherein x ranges from about 0.1 to about 1.0 and z ranges from about 20 to about 500. A core diameter (CD) may be selected by changing the molar mass of the diblock and will typically have a diameter ranging from about 10 to about 50 nanometers.

An oil-soluble block copolymer is provided as the corona 14 surrounding the core 12. Accordingly, a suitable block copolymer may be derived from poly[(2-ethylalkyl acrylate)-ran-(alkyl acrylate)]-block-poly(2-hydroxyalkyl acrylate) such as poly[(2-ethylhexyl acrylate)-ran-(tert-butyl acrylate)]-block-poly(2-hydroxyethyl acrylate) or P(EXA-r-tBA)-b-PHEA illustrated by the following formula:

wherein y ranges from about 0.001 to about 0.5, m ranges from about 20 to about 500 and n ranges from about 20 to about 500. The corona 14 noticeably increases the hydrodynamic diameter (HD) of the nanospherical component 10 so that the overall average diameter ranges from about 20 to about 100 nanometers.

The P(EXA-r-tBA) block was chosen to provide the corona 14 for the nanospheres 10 due to its solubility in lubricating base oils, which consist mostly of paraffins, aromatics and naphthenes (cycloparaffins). A small mole fraction y of tBA, e.g. less than 1.5%, may incorporated into the block copolymer for the corona 14 so that the tBA may be selectively hydrolyzed to yield acrylic acid or AA groups to facilitate nanosphere adsorption on the surfaces of metals or other substrates. The PHEA block was chosen for its easy derivatisation. The hydroxyl groups of PHEA may be reacted with cinnamoyl chloride to yield a photocrosslinkable poly(2-cinnamoyloxyethyl acrylate) or PCEA block. The glass transition temperature of the derivatised PHEA block may be adjusted by reacting a fraction of the HEA hydroxyl groups with octanoyl chloride to yield poly((2-cinnamoyloxyethyl acrylate)-ran-(2-octanoyloxyethyl acrylate)) or P(CEA-r-OEA).

The nanospheres 10 may be prepared in hexane or tetrahydrofuran/hexane with a high content of hexane, which is believed to be a block-selective solvent for the P(EXA-r-tBA) block. In such a block-selective solvent, the insoluble PCEA or P(CEA-r-OEA) block may form the core of either spherical or cylindrical aggregates, depending on the n/m value of the diblock and the solvent. The soluble P(EXA-r-tBA) block provides the corona 14. The core 12 of such aggregate may be crosslinked photochemically to lock in the structure to provide substantially permanent nanoparticles.

EXAMPLE 1

P(EXA-r-tBA)-b-PHEA Synthesis

The base set of polymers P(EXA-r-tBA)-b-PHEA providing the corona 14 may be prepared by hydrolyzing P(EXA-r-tBA)-b-P(HEA-TMS), where P(HEA-TMS) denotes poly(2-trimethylsilyoxyethyl acrylate). P(EXA-r-tBA)-b-P(HEA-TMS) may be synthesized by an atom transfer radical polymerization (ATRP) process for making PBA-b-(P(HEA-TMS), where PBA denotes poly(butyl acrylate). The initiating system includes methyl 2-bromopropionate ($CH_3CHBrCO_2CH_3$), copper(I) bromide and N, N, N', N'', N''-pentamethyldiethylenetriamine (PMDETA) of the formula (($CH_3$)$_2$ $NCH_2$ $CH_2$)$_2NCH_3$.

P(EXA-r-tBA)-b-P(HEA-TMS) may be prepared by copolymerizing EXA and a small amount tBA in a nonpolar solvent such as toluene. The mole fraction of tBA in the feed ratio should be less than 1.5%. After purification of the first block, the first block may be used as a macro-initiator to polymerize the second monomer, trimethylsilyloxyethyl acrylate or HEA-TMS. The TMS groups may be removed by hydrolysis in aqueous THF by adding drops of acetic acid.

EXAMPLE 2

P(EXA-r-IBA)-b-PCEA Synthesis

The P(EXA-r-tBA)-b-PHEA made according to Example 1 may be reacted with cinnamoyl chloride in pyridine to provide P(EXA-r-tBA)-b-PCEA. PCEA is desirable for its photocrosslinkability of the nanospheres 10. In order to lower the glass transition temperature $T_g$ of the core-forming block copolymer, a portion of the hydroxyl groups may be reacted with octanoyl chloride before reacting with an excess of cinnamoyl chloride to yield P(EXA-r-tBA)-b-P(CEA-r-OEA). The CEA molar fraction in the block copolymer is desirably no lower than 50% to facilitate effective core crosslinking.

While not desiring to be bound by theory, it is believed that lubricating oils achieve lubrication primarily by two mechanisms. Based on the law of fluid dynamics, a hydrodynamic pressure pushing two sliding surfaces apart is the highest in regions where the two surfaces are the closest. The pressure supports the load and avoids the direct contact of the sliding surfaces in the hydrodynamic lubrication (HDL) regime. In a high load and/or low speed situation, a lubricant system enters a mixed lubrication (ML) or a boundary lubrication (BL) regime and the asperities of the surfaces are inevitably in partial or extensive contact. A lubricant containing amphiphilic molecules avoids the direct contact of the asperities by forming a film on the surfaces. The adsorbed films reduce friction because they are more readily sheared off from a surface that is metal and can reform on the metal surfaces after the moving parts move away from one another. Also the adsorbed films normally repel one another as has been demonstrated for polymer brushes formed on sliding mica surfaces.

It is expected the foregoing block copolymer nanospherical components 10 may function as friction modifiers and antiwear agents by one or more of the following mechanisms: a) physical separation of the sliding surfaces by the nanospherical components, b) conversion of sliding friction between the sliding surfaces to a rolling friction between the surfaces and nanospherical components, and c) coating of the adjacent surfaces by the nanospherical components or fragments of the components. Unlike fullerenes or inorganic nanoparticles, the bock copolymer nanospherical components 10 may enable wider particle size and shape control.

The oil-soluble nanospherical components 10 described above are advantageously incorporated into lubricating compositions. Accordingly, the oil-soluble nanospherical components 10 may be added directly to a finished lubricating oil composition. In one embodiment, however, the oil-soluble nanospherical component 10 is diluted with a substantially inert, normally liquid organic diluent such as mineral oil, synthetic oil (e.g., ester of dicarboxylic acid), naptha, alkylated (e.g., $C_{10}$-$C_{13}$ alkyl) benzene, toluene or xylene to form an additive concentrate. The additive concentrates may contain from about 0% to about 99% by weight diluent oil and the oil-soluble nanospherical component 10.

In the preparation of lubricating oil formulations it is common practice to introduce the additive concentrate in the form of 1 to 99 wt. % active ingredient concentrates in hydrocarbon oil, e.g. mineral lubricating oil, or other suitable solvent. Usually these concentrates may be added to a lubricating oil with a dispersant/inhibitor (DI) additive package and viscosity index (VI) improvers containing 0.01 to 50 parts by weight of lubricating oil per part by weight of the DI package to form finished lubricants, e.g. crankcase motor oils. Suitable DI packages are described for example in U.S. Pat. Nos. 5,204,012 and 6,034,040 for example. Among the types of additives included in the DI additive package are detergents, dispersants, antiwear agents, friction modifiers, seal swell agents, antioxidants, foam inhibitors, lubricity agents, rust inhibitors, corrosion inhibitors, demulsifiers, viscosity index improvers, and the like. Several of these components are well known to those skilled in the art and are used in conventional amounts with the additives and compositions described herein.

Lubricant compositions made with the nanospherical components described above are used in a wide variety of applications. For compression ignition engines and spark ignition engines, it is preferred that the lubricant compositions meet or exceed published API-CI-4 or GF-4 standards. Lubricant compositions according to the foregoing API-CI-4 or GF-4 standards include a base oil, the DI additive package, and/or a VI improver to provide a fully formulated lubricant. The base oil for lubricants according to the disclosure is an oil of lubricating viscosity selected from natural lubricating oils, synthetic lubricating oils and mixtures thereof. Such base oils include those conventionally employed as crankcase lubricating oils for spark-ignited and compression-ignited internal combustion engines, such as automobile and truck engines, marine and railroad diesel engines, and the like.

The nanospherical components 10 described above may be used in fully formulated automatic transmission fluids, fully formulated crankcase fluids, fully formulated heavy duty gear fluids, and the like. Such nanospherical components may be effective to reduce friction coefficient and wear.

The nanospherical components may be present in an amount of up to about 5 wt % in a fully formulated lubricant composition. As another example, the nanospherical components may be present in an amount of about 0.1 to about 5 wt % in a fully formulated lubricant composition. As an even further example, the nanospherical components may be present in an amount of about 0.5 to about 2 wt % in a fully formulated lubricant composition.

Suitable nanospherical components may have a core diameter of from about 10 to about 100 nm and a hydrodynamic diameter of from about 10 to about 120 nm.

Dispersant Components

Dispersants contained in the DI package include, but are not limited to, an oil soluble polymeric hydrocarbon backbone having functional groups that are capable of associating with particles to be dispersed. Typically, the dispersants comprise amine, alcohol, amide, or ester polar moieties attached to the polymer backbone often via a bridging group. Dispersants may be selected from Mannich dispersants as described in U.S. Pat. Nos. 3,697,574 and 3,736,357; ashless succinimide dispersants as described in U.S. Pat. Nos. 4,234,435 and 4,636,322; amine dispersants as described in U.S. Pat. Nos. 3,219,666, 3,565,804, and 5,633,326; Koch dispersants as described in U.S. Pat. Nos. 5,936,041, 5,643,859, and 5,627,259, and polyalkylene succinimide dispersants as described in U.S. Pat. Nos. 5,851,965; 5,853,434; and 5,792,729.

Oxidation Inhibitor Components

Oxidation inhibitors or antioxidants reduce the tendency of base stocks to deteriorate in service which deterioration can be evidenced by the products of oxidation such as sludge and varnish-like deposits that deposit on metal surfaces and by viscosity growth of the finished lubricant. Such oxidation inhibitors include hindered phenols, sulfurized hindered phenols, alkaline earth metal salts of alkylphenolthioesters having $C_5$ to $C_{12}$ alkyl side chains, sulfurized alkylphenols, metal salts of either sulfurized or nonsulfurized alkylphenols, for example calcium nonylphenol sulfide, ashless oil soluble phenates and sulfurized phenates, phosphosulfurized or sulfurized hydrocarbons, phosphorus esters, metal thiocarbamates, and oil soluble copper compounds as described in U.S. Pat. No. 4,867,890.

Other antioxidants that may be used include sterically hindered phenols and diarylamines, alkylated phenothiazines, sulfurized compounds, and ashless dialkyldithiocarbamates. Non-limiting examples of sterically hindered phenols include, but are not limited to, 2,6-di-tertiary butylphenol, 2,6 di-tertiary butyl methylphenol, 4-ethyl-2,6-di-tertiary butylphenol, 4-propyl-2,6-di-tertiary butylphenol, 4-butyl-2,6-di-tertiary butylphenol, 4-pentyl-2,6-di-tertiary butylphenol, 4-hexyl-2,6-di-tertiary butylphenol, 4-heptyl-2,6-di-tertiary butylphenol, 4-(2-ethylhexyl)-2,6-di-tertiary butylphenol, 4-octyl-2,6-di-tertiary butylphenol, 4-nonyl-2,6-di-tertiary butylphenol, 4-decyl-2,6-di-tertiary butylphenol, 4-undecyl-2,6-di-tertiary butylphenol, 4-dodecyl-2,6-di-tertiary butylphenol, methylene bridged sterically hindered phenols including but not limited to 4,4-methylenebis(6-tert-butyl-o-cresol), 4,4-methylenebis(2-tert-amyl-o-cresol), 2,2-methylenebis(4-methyl-6 tert-butylphenol, 4,4-methylenebis(2,6-di-tert-butylphenol) and mixtures thereof as described in U.S Publication No. 2004/0266630.

Diarylamine antioxidants include, but are not limited to diarylamines having the formula:

wherein R' and R" each independently represents a substituted or unsubstituted aryl group having from 6 to 30 carbon atoms. Illustrative of substituents for the aryl group include aliphatic hydrocarbon groups such as alkyl having from 1 to 30 carbon atoms, hydroxy groups, halogen radicals, carboxylic acid or ester groups, or nitro groups.

The aryl group is preferably substituted or unsubstituted phenyl or naphthyl, particularly wherein one or both of the aryl groups are substituted with at least one alkyl having from 4 to 30 carbon atoms, preferably from 4 to 18 carbon atoms, most preferably from 4 to 9 carbon atoms. It is desirable that one or both aryl groups be substituted, e.g. mono-alkylated diphenylamine, di-alkylated diphenylamine, or mixtures of mono- and di-alkylated diphenylamines.

The diarylamines may be of a structure containing more than one nitrogen atom in the molecule. Thus the diarylamine may contain at least two nitrogen atoms wherein at least one nitrogen atom has two aryl groups attached thereto, e.g. as in the case of various diamines having a secondary nitrogen atom as well as two aryls on one of the nitrogen atoms.

Examples of diarylamines that may be used include, but are not limited to: diphenylamine; various alkylated diphenylamines; 3-hydroxydiphenylamine; N-phenyl-1,2-phenylenediamine; N-phenyl-1,4-phenylenediamine; monobutyldiphenyl-amine; dibutyldiphenylamine; monooctyldiphenylamine; dioctyldiphenylamine; mononoyldiphenylamine; dinonyldiphenylamine; monotetradecyldiphenylamine; ditetradecyldiphenylamine, phenyl-alpha-naphthylamine; monooctyl phenyl-alpha-naphthylamine; phenyl-beta-naphthylamine; monoheptyldiphenylamine; diheptyl-diphenylamine; p-oriented styrenated diphenylamine; mixed butyloctyldi-phenylamine; and mixed octylstyryldiphenylamine.

Another class of aminic antioxidants includes phenothiazine or alkylated phenothiazine having the chemical formula:

wherein $R_1$ is a linear or branched $C_1$ to $C_{24}$ alkyl, aryl, heteroalkyl or alkylaryl group and $R_2$ is hydrogen or a linear or branched $C_1$-$C_{24}$ alkyl, heteroalkyl, or alkylaryl group.

Alkylated phenothiazine may be selected from the group consisting of monotetradecylphenothiazine, ditetradecylphenothiazine, monodecylphenothiazine, didecylphenothiazine, monononylphenothiazine, dinonylphenothiazine, monoctylphenothiazine, dioctylphenothiazine, monobutylphenothiazine, dibutylphenothiazine, monostyrylphenothiazine, distyrylphenothiazine, butyloctylphenothiazine, and styryloctylphenothiazine.

The sulfur containing antioxidants include, but are not limited to, sulfurized olefins that are characterized by the type of olefin used in their production and the final sulfur content of the antioxidant. High molecular weight olefins, i.e. those olefins having an average molecular weight of 168 to 351 g/mole, are preferred. Examples of olefins that may be used include alpha-olefins, isomerized alpha-olefins, branched olefins, cyclic olefins, and combinations of these.

Alpha-olefins include, but are not limited to, any $C_4$ to $C_{25}$ alpha-olefins. Alpha-olefins may be isomerized before the sulfurization reaction or during the sulfurization reaction. Structural and/or conformational isomers of the alpha olefin that contain internal double bonds and/or branching may also be used. For example, isobutylene is a branched olefin counterpart of the alpha-olefin 1-butene.

Sulfur sources that may be used in the sulfurization reaction of olefins include: elemental sulfur, sulfur monochloride, sulfur dichloride, sodium sulfide, sodium polysulfide, and mixtures of these added together or at different stages of the sulfurization process.

Unsaturated oils, because of their unsaturation, may also be sulfurized and used as an antioxidant. Examples of oils or fats that may be used include corn oil, canola oil, cottonseed oil, grapeseed oil, olive oil, palm oil, peanut oil, coconut oil, rapeseed oil, safflower seed oil, sesame seed oil, soyabean oil, sunflower seed oil, tallow, and combinations of these.

The amount of sulfurized olefin or sulfurized fatty oil delivered to the finished lubricant is based on the sulfur content of the sulfurized olefin or fatty oil and the desired level of sulfur to be delivered to the finished lubricant. For example, a sulfurized fatty oil or olefin containing 20 weight % sulfur, when added to the finished lubricant at a 1.0 weight % treat level, will deliver 2000 ppm of sulfur to the finished lubricant. A sulfurized fatty oil or olefin containing 10 weight % sulfur, when added to the finished lubricant at a 1.0 weight % treat level, will deliver 1000 ppm sulfur to the finished lubricant. It is desirable to add the sulfurized olefin or sulfurized fatty oil to deliver between 200 ppm and 2000 ppm sulfur to the finished lubricant. The foregoing aminic, phenothiazine, and sulfur containing antioxidants are described for example in U.S. Pat. No. 6,599,865.

The ashless dialkyldithiocarbamates which may be used as antioxidant additives include compounds that are soluble or dispersable in the additive package. It is also desired that the ashless dialkyldithiocarbamate be of low volatility, with a molecular weight greater than 250 daltons, desirably, a molecular weight greater than 400 daltons. Examples of ashless dithiocarbamates that may be used include, but are not limited to, methylenebis(dialkyldithiocarbamate), ethylenebis(dialkyldithiocarbamate), isobutyl disulfide-2,2'-bis (dialkyldithiocarbamate), hydroxyalkyl substituted dialkyldithio-carbamates, dithiocarbamates prepared from unsaturated compounds, dithiocarbamates prepared from norbornylene, and dithiocarbamates prepared from epoxides, where the alkyl groups of the dialkyldithiocarbamate can preferably have from 1 to 16 carbons. Examples of dialkyldithiocarbamates that may be used are disclosed in the following patents: U.S. Pat. Nos. 5,693,598; 4,876,375; 4,927, 552; 4,957,643; 4,885,365; 5,789,357; 5,686,397; 5,902,776; 2,786,866; 2,710,872; 2,384,577; 2,897,152; 3,407,222; 3,867,359; and 4,758,362.

Examples of ashless dithiocarbamates are: Methylenebis-(dibutyldithiocarbamate), Ethylenebis(dibutyldithiocarbamate), Isobutyl disulfide-2,2'-bis(dibutyldithiocarbamate), Dibutyl-N,N-dibutyl-(dithiocarbamyl)succinate, 2-hydroxypropyl dibutyldithiocarbamate, Butyl(dibutyldithiocarbamyl)acetate, and S-carbomethoxy-ethyl-N,N-dibutyl dithiocarbamate. The most desirable ashless dithiocarbamate is methylenebis(dibutyldithiocarbamate).

Zinc dialkyl dithiophosphates ("Zn DDPs") may also be used in lubricating oils in addition to the nanospherical components. Zn DDPs have good antiwear and antioxidant properties and have been used to pass cam wear tests, such as the Seq. IVA and TU3 Wear Test. Many patents address the manufacture and use of Zn DDPs including U.S. Pat. Nos. 4,904,401; 4,957,649; and 6,114,288. Non-limiting general Zn DDP types are primary, secondary and mixtures of primary and secondary Zn DDPs Likewise, organomolybdenum containing compounds used as friction modifiers may also exhibit antioxidant functionality. U.S. Pat. No. 6,797,677 describes a combination of organomolybdenum compound, alkylphenothizine and alkyldiphenylamines for use in finished lubricant formulations. Examples of suitable molybdenum containing friction modifiers are described below under friction modifiers.

The nanospherical components described herein may be used with any or all of the foregoing antioxidants in any and all combinations and ratios. It is understood that various combinations of phenolic, aminic, sulfur containing and molybdenum containing additives may be optimized for the finished lubricant formulation based on bench or engine tests or modifications of the dispersant, VI improver, base oil, or any other additive.

Friction Modifier Components

A sulfur- and phosphorus-free organomolybdenum compound that may be used as an additional friction modifier may be prepared by reacting a sulfur- and phosphorus-free molybdenum source with an organic compound containing amino and/or alcohol groups. Examples of sulfur- and phosphorus-free molybdenum sources include molybdenum trioxide, ammonium molybdate, sodium molybdate and potassium molybdate. The amino groups may be monoamines, diamines, or polyamines. The alcohol groups may be monosubstituted alcohols, diols or bis-alcohols, or polyalcohols. As an example, the reaction of diamines with fatty oils produces a product containing both amino and alcohol groups that can react with the sulfur- and phosphorus-free molybdenum source.

Examples of sulfur- and phosphorus-free organomolybdenum compounds include the following:

1. Compounds prepared by reacting certain basic nitrogen compounds with a molybdenum source as described in U.S. Pat. Nos. 4,259,195 and 4,261,843.

2. Compounds prepared by reacting a hydrocarbyl substituted hydroxy alkylated amine with a molybdenum source as described in U.S. Pat. No. 4,164,473.

3. Compounds prepared by reacting a phenol aldehyde condensation product, a mono-alkylated alkylene diamine, and a molybdenum source as described in U.S. Pat. No. 4,266,945.

4. Compounds prepared by reacting a fatty oil, diethanolamine, and a molybdenum source as described in U.S. Pat. No. 4,889,647.

5. Compounds prepared by reacting a fatty oil or acid with 2-(2-aminoethyl)aminoethanol, and a molybdenum source as described in U.S. Pat. No. 5,137,647.

6. Compounds prepared by reacting a secondary amine with a molybdenum source as described in U.S. Pat. No. 4,692,256.

7. Compounds prepared by reacting a diol, diamino, or amino-alcohol compound with a molybdenum source as described in U.S. Pat. No. 5,412,130.

8. Compounds prepared by reacting a fatty oil, mono-alkylated alkylene diamine, and a molybdenum source as described in U.S. Pat. No. 6,509,303.

9. Compounds prepared by reacting a fatty acid, mono-alkylated alkylene diamine, glycerides, and a molybdenum source as described in U.S. Pat. No. 6,528,463.

Molybdenum compounds prepared by reacting a fatty oil, diethanolamine, and a molybdenum source as described in U.S. Pat. No. 4,889,647 are sometimes illustrated with the following structure, where R is a fatty alkyl chain, although the exact chemical composition of these materials is not fully known and may in fact be multi-component mixtures of several organomolybdenum compounds.

Sulfur-containing organomolybdenum compounds may be used and may be prepared by a variety of methods. One method involves reacting a sulfur and phosphorus-free molybdenum source with an amino group and one or more sulfur sources. Sulfur sources can include for example, but are not limited to, carbon disulfide, hydrogen sulfide, sodium sulfide and elemental sulfur. Alternatively, the sulfur-containing molybdenum compound may be prepared by reacting a sulfur-containing molybdenum source with an amino group or thiuram group and optionally a second sulfur source.

Examples of sulfur- and phosphorus-free molybdenum sources include molybdenum trioxide, ammonium molybdate, sodium molybdate, potassium molybdate, and molybdenum halides. The amino groups may be monoamines, diamines, or polyamines. As an example, the reaction of molybdenum trioxide with a secondary amine and carbon disulfide produces molybdenum dithiocarbamates. Alternatively, the reaction of $(NH_4)_2Mo_3S_{13}*n(H_2O)$ where n varies between 0 and 2, with a tetralkylthiuram disulfide, produces a trinuclear sulfur-containing molybdenum dithiocarbamate.

Examples of sulfur-containing organomolybdenum compounds appearing in patents and patent applications include the following:

1. Compounds prepared by reacting molybdenum trioxide with a secondary amine and carbon disulfide as described in U.S. Pat. Nos. 3,509,051 and 3,356,702.

2. Compounds prepared by reacting a sulfur-free molybdenum source with a secondary amine, carbon disulfide, and an additional sulfur source as described in U.S. Pat. No. 4,098,705.

3. Compounds prepared by reacting a molybdenum halide with a secondary amine and carbon disulfide as described in U.S. Pat. No. 4,178,258.

4. Compounds prepared by reacting a molybdenum source with a basic nitrogen compound and a sulfur source as described in U.S. Pat. Nos. 4,263,152, 4,265,773, 4,272,387, 4,285,822, 4,369,119, and 4,395,343.

5. Compounds prepared by reacting ammonium tetrathiomolybdate with a basic nitrogen compound as described in U.S. Pat. No. 4,283,295.

6. Compounds prepared by reacting an olefin, sulfur, an amine and a molybdenum source as described in U.S. Pat. No. 4,362,633.

7. Compounds prepared by reacting ammonium tetrathiomolybdate with a basic nitrogen compound and an organic sulfur source as described in U.S. Pat. No. 4,402,840.

8. Compounds prepared by reacting a phenolic compound, an amine and a molybdenum source with a sulfur source as described in U.S. Pat. No. 4,466,901.

9. Compounds prepared by reacting a triglyceride, a basic nitrogen compound, a molybdenum source, and a sulfur source as described in U.S. Pat. No. 4,765,918.

10. Compounds prepared by reacting alkali metal alkylthioxanthate salts with molybdenum halides as described in U.S. Pat. No. 4,966,719.

11. Compounds prepared by reacting a tetralkylthiuram disulfide with molybdenum hexacarbonyl as described in U.S. Pat. No. 4,978,464.

12. Compounds prepared by reacting an alkyl dixanthogen with molybdenum hexacarbonyl as described in U.S. Pat. No. 4,990,271.

13. Compounds prepared by reacting alkali metal alkylxanthate salts with dimolybdenum tetra-acetate as described in U.S. Pat. No. 4,995,996.

14. Compounds prepared by reacting $(NH_4)_2Mo_3S_{13}*2H_2O$ with an alkali metal dialkyldithiocarbamate or tetralkyl thiuram disulfide as described in U.S. Pat. No. 6,232,276.

15. Compounds prepared by reacting an ester or acid with a diamine, a molybdenum source and carbon disulfide as described in U.S. Pat. No. 6,103,674.

16. Compounds prepared by reacting an alkali metal dialkyldithiocarbamate with 3-chloropropionic acid, followed by molybdenum trioxide, as described in U.S. Pat. No. 6,117,826.

Molybdenum dithiocarbamates may be illustrated by the following structure, where R is an alkyl group containing 4 to 18 carbons or H, and X is O or S.

Glycerides may also be used alone or in combination with other friction modifiers. Suitable glycerides include glycerides of the formula:

wherein each R is independently selected from the group consisting of H and C(O)R' where R' may be a saturated or an unsaturated alkyl group having from 3 to 23 carbon atoms. Examples of glycerides that may be used include glycerol monolaurate, glycerol monomyristate, glycerol monopalmitate, glycerol monostearate, and mono-glycerides derived from coconut acid, tallow acid, oleic acid, linoleic acid, and linolenic acids. Typical commercial monoglycerides contain substantial amounts of the corresponding diglycerides and triglycerides. These materials are not detrimental to the production of the molybdenum compounds, and may in fact be more active. Any ratio of mono- to di-glyceride may be used, however, it is preferred that from 30 to 70% of the available sites contain free hydroxyl groups (i.e., 30 to 70% of the total R groups of the glycerides represented by the above formula are hydrogen). A preferred glyceride is glycerol monooleate, which is generally a mixture of mono, di, and tri-glycerides derived from oleic acid, and glycerol.

Additional Additives

Rust inhibitors selected from the group consisting of non-ionic polyoxyalkylene polyols and esters thereof, polyoxyalkylene phenols, and anionic alkyl sulfonic acids may be used.

A small amount of a demulsifying component may be used. A preferred demulsifying component is described in EP 330,522. Such demulsifying component may be obtained by reacting an alkylene oxide with an adduct obtained by reacting a bis-epoxide with a polyhydric alcohol. The demulsifier should be used at a level not exceeding 0.1 mass % active ingredient. A treat rate of 0.001 to 0.05 mass % active ingredient is convenient.

Pour point depressants, otherwise known as lube oil flow improvers, lower the minimum temperature at which the fluid will flow or can be poured. Such additives are well known. Typical of those additives which improve the low temperature fluidity of the fluid are $C_8$ to $C_{18}$ dialkyl fumarate/vinyl acetate copolymers, polyalkylmethacrylates and the like.

Foam control can be provided by many compounds including an antifoamant of the polysiloxane type, for example, silicone oil or polydimethyl siloxane.

Seal swell agents, as described, for example, in U.S. Pat. Nos. 3,794,081 and 4,029,587, may also be used.

Viscosity modifiers (VM) function to impart high and low temperature operability to a lubricating oil. The VM used may have that sole function, or may be multifunctional.

Multifunctional viscosity modifiers that also function as dispersants are also known. Suitable viscosity modifiers are polyisobutylene, copolymers of ethylene and propylene and higher alpha-olefins, polymethacrylates, polyalkylmethacrylates, methacrylate copolymers, copolymers of an unsaturated dicarboxylic acid and a vinyl compound, inter polymers of styrene and acrylic esters, and partially hydrogenated copolymers of styrene/isoprene, styrene/butadiene, and isoprene/butadiene, as well as the partially hydrogenated homopolymers of butadiene and isoprene and isoprene/divinylbenzene.

Functionalized olefin copolymers that may be used include interpolymers of ethylene and propylene which are grafted with an active monomer such as maleic anhydride and then derivatized with an alcohol or amine. Other such copolymers are copolymers of ethylene and propylene which are grafted with nitrogen compounds.

Each of the foregoing additives, when used, is used at a functionally effective amount to impart the desired properties to the lubricant. Thus, for example, if an additive is a corrosion inhibitor, a functionally effective amount of this corrosion inhibitor would be an amount sufficient to impart the desired corrosion inhibition characteristics to the lubricant. Generally, the concentration of each of these additives, when used, ranges up to about 20% by weight based on the weight of the lubricating oil composition, and in one embodiment from about 0.001% to about 20% by weight, and in one embodiment about 0.01% to about 10% by weight based on the weight of the lubricating oil composition.

The nanospherical components may be added directly to the lubricating oil composition. In one embodiment, however, they are diluted with a substantially inert, normally liquid organic diluent such as mineral oil, synthetic oil, naphtha, alkylated (e.g. $C_{10}$ to $C_{13}$ alkyl) benzene, toluene or xylene to form an additive concentrate. These concentrates usually contain from about 1% to about 100% by weight and in one embodiment about 10% to about 90% by weight of the nanospherical components.

Base Oils

Base oils suitable for use in formulating the compositions, additives and concentrates described herein may be selected from any of the synthetic or natural oils or mixtures thereof. The synthetic base oils include alkyl esters of dicarboxylic acids, polyglycols and alcohols, poly-alpha-olefins, including polybutenes, alkyl benzenes, organic esters of phosphoric acids, polysilicone oils, and alkylene oxide polymers, interpolymers, copolymers and derivatives thereof where the terminal hydroxyl groups have been modified by esterification, etherification, and the like. The synthetic oils may also include the gas to liquid synthetic oils.

Natural base oils include animal oils and vegetable oils (e.g., castor oil, lard oil), liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. The base oil typically has a viscosity of about 2.5 to about 15 cSt and preferably about 2.5 to about 11 cSt at 100° C.

The following examples are given for the purpose of exemplifying aspects of the embodiments and are not intended to limit the embodiments in any way.

EXAMPLE 3

Boundary Friction Coefficients of Oil-Soluble Nanospherical Components

In the following example, a base oil (EXXON EHC45) was added to a nanospherical component containing nanospheres solubilized in tetrahydrofuran (THF) until 70 wt. % of the solution was the base oil so that the concentration of nanospheres in the base oil was about 0.07 weight percent. Boundary friction coefficients of nanospherical component solutions containing different size nanospheres were measured in a high frequency reciprocating test rig (HFRR) at a temperature of 30° C. Sample 1 was nanospheres having a core diameter of 20 nanometers and a core plus corona hydrodynamic diameter of 45 nanometers. Sample 2 was nanospheres having a core diameter of 40 nanometers and a core plus corona hydrodynamic diameter of 89 nanometers. A 30/70 wt. % mixture of THF and the base oil was also examined as a control. The boundary friction coefficients determined on the HFRR are shown in Table 1.

TABLE 1

| Sample | Boundary Friction Coefficient at 30° C. | % Reduction in Friction versus THF/Group II Base Oil Mixture |
| --- | --- | --- |
| THF/Base oil (EXXON EHC45) | 0.185 +/− 0.010 | 0% |
| Sample 1 in THF/Base oil (EXXON EHC45) | 0.141 +/− 0.006 | 24% |
| Sample 2 in THF/Base oil (EXXON EHC45) | 0.129 +/− 0.002 | 30% |

Sample 1 and Sample 2 could not be tested at higher temperatures due to the flash point of the THF. However, the results indicated that both size nanospheres were effective to reduce friction under pure sliding conditions.

In order to measure the boundary friction of oils containing each nanosphere sample at a temperature more relevant to the condition commonly used to study the boundary friction of engine oils or other lubricants, one weight percent solutions of the nanospheres suspended in the Group II base oil were prepared. The boundary friction coefficients for the nanosphere/Base oil (EXXON EHC45) solutions were measured at 100° C. and are shown in Table 2.

TABLE 2

| Sample | Boundary Friction Coefficient at 100° C. | % Reduction in Friction at 100° C. vs Base oil (EXXON EHC45) |
|---|---|---|
| Base oil (EXXON EHC45) | 0.159 +/− 0.002 | 0 |
| Sample 1 in Base oil (EXXON EHC45) | 0.144 +/− 0.001 | 9% |
| Sample 2 in Base oil (EXXON EHC45) | 0.142 +/− 0.003 | 11% |

As indicated by the results in Table 2, both nanospherical components reduced friction relative to a base oil having an absence of the nanospherical components.

EXAMPLE 4

Friction Coefficients of Oil-Soluble Nanospherical Components

Since most of the real world lubrication conditions contain both sliding and rolling contacts, it was important to evaluate the friction coefficient of oils containing nanospheres as described above under rolling-sliding conditions. The friction coefficients of a base oil (EXXON EHC45) containing the Sample 1 and Sample 2 nanospheres were determined using a Mini-Traction Machine (MTM) available from PCS Instruments of London, England. In the MTM, a 35 Newton (N) load was applied between a disk and a steel ball as fluid was pulled through the contact zone at entrainment speeds of from 0.1 to 2.0 meters per second at 100° C. The disk and the ball were rotated independently so that friction was measured at a slide to roll ratio of 20%.

Figure 2:
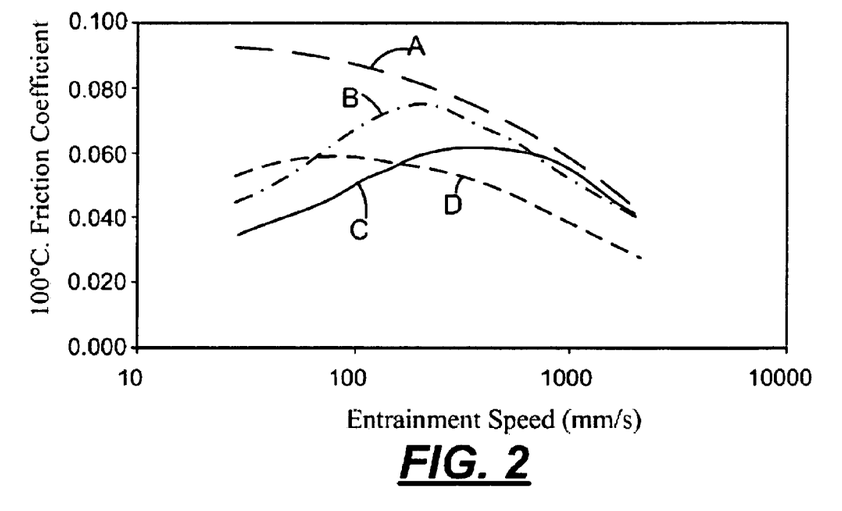
FIGS. 2 and 3 are graphical illustrations of friction coefficient data for a base oil and for a base oil containing oil-soluble nanospheres according to the disclosure.

FIG. 2 shows the friction measured at 100° C. and 35N load for the base oil (EXXON EHC45) and for 1 wt. % solutions of nanospheres in the base oil. Friction was measured at various fluid entrainment speeds at a slide to roll ratio of 20%. Curve A was the friction coefficients for the base oil alone. Curve B was a 1 wt. % solution of the Sample 1 nanospheres in the base oil. Curve C was a 1 wt. % solution of the Sample 2 nanospheres in the base oil. Curve D was a 1 wt. % solution of a conventional friction modifier in the base oil.

As seen in FIG. 2, the friction coefficients represented by Curves A, B and C were similar. At such speeds, it is believed that fluid films existed so that the friction coefficients of the fluid films were dependent upon the rheological properties of the fluids rather than surface active agents in the fluids at speeds above 1000 mm/s.

However, at low speeds the friction coefficients for the nanosphere solutions (Curves B and C) decreased as speed decreased. Furthermore, the decrease in friction coefficients with decreasing speed occurred at higher speeds for the larger nanospheres (Sample 2). At lower speeds the MTM is operating in the mixed or boundary friction regime. Likewise, the conventional friction modifier (Curve D) also reduced the friction coefficients at lower speeds in the MTM. However, for the fluid containing the conventional friction modifier (Curve D), the friction coefficient was relatively constant at speeds of less than 100 mm/sec, whereas the friction coefficients for the fluids containing the nanospheres (Curves B and C) were not constant at these speeds. Hence, the friction reduction properties of the nanospheres were found to be distinct from the friction reduction properties of conventional friction modifiers.

Figure 3:
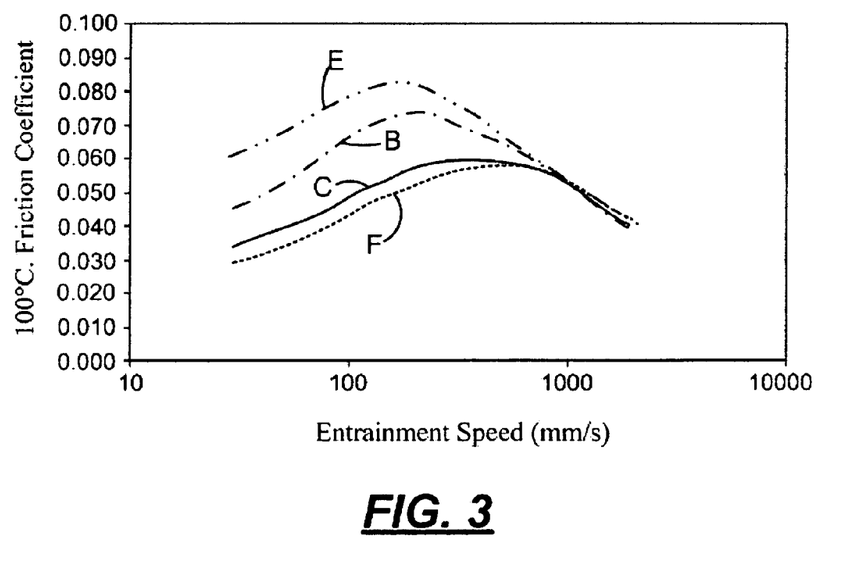

In order to determine if there is a concentration dependence to the activity of the nanospheres, 0.5 wt. % solutions of the nanospheres in the base oil (EXXON EHC45) were prepared. The frictional properties of the solutions were measured in the MTM under the same conditions as the 1 wt. % solutions. The frictional data for the 1 wt. % and the 0.5 wt. % solutions are shown in FIG. 3, wherein Curves B and C represent the 1 wt. % solutions and Curves E and F represent the 0.5 wt. % solutions. Curve E was determined with the Sample 1 nanospheres and Curve F was determined with the Sample 2 nanospheres.

FIG. 3 showed that the friction reducing properties of the fluids (Curves C and F) containing the larger nanospheres (Sample 2) were similar. However, a reduction in concentration of the smaller nanospheres (Sample 1) influenced the coefficient of friction activity as shown by comparing Curve E to Curve B. In particular, friction coefficients at low speeds for the 0.5 wt % solution of the Sample 1 nanospheres (Curve E) was higher than those for the 1 wt. % solution (Curve B). The speed at which friction decreases is the same for both concentrations of the Sample 1 nanosphere solutions.

Figure 4:
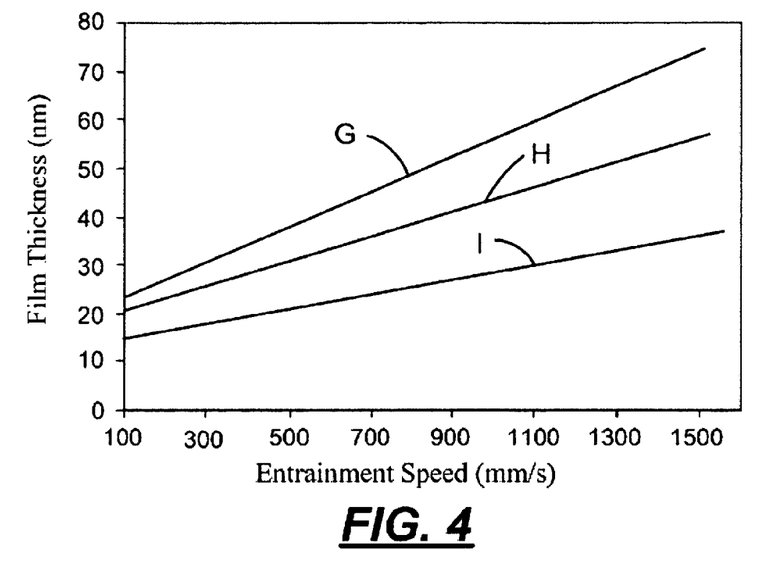
FIG. 4 is a graphical illustration of a film thicknesses for base oils at different temperatures.

The MTM friction coefficient data illustrated in FIGS. 2 and 3 showed that the speed at which friction begins to decrease is higher for the larger nanospheres (Sample 2) than for the smaller nanospheres (Sample 1). It is generally believed that the elastohydrodynamic (EHD) film thickness of fluids increases with increasing speed. In order to determine if there is a relationship between the film thickness and speed, the film thickness of the Base oil (EXXON EHC45) was measured using an optical interferometer. FIG. 4 illustrates the film thickness of Base oil (EXXON EHC45) at various speeds and at 75° C. (Curve G), 100° C. (Curve H) and 125° C. (Curve I). As the temperature of the base oil increased the film thickness of the base oil decreased. In addition as the speed decreased the film thickness of the base oil decreased.

Figure 5:
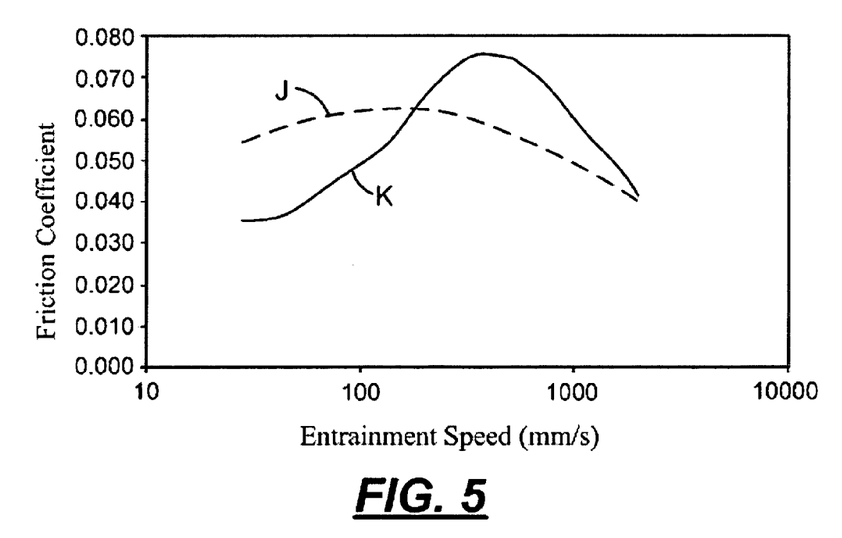
FIG. 5 is a graphical illustration of the friction coefficients for nanospheres in a base oil at different temperatures.

The frictional behavior of the nanosphere solutions were additionally measured in the MTM at 75° C. and 125° C. FIG. 5 illustrates the friction coefficient versus speed curves for 1 wt. % solution of the Sample 2 nanospheres in the Base oil (EXXON EHC45) at 75° C. (Curve J) and 125° C. At both temperatures friction decreased as the speed decreased at relatively low speeds. The speed at which the decrease in friction was initiated was about 300 mm/s at 75° C. and was about 600 mm/s at 125° C. At these temperature and speed combinations the film thickness of the base oil (EXXON EHC45) was between 20 and 30 nm, which is less than the core diameter of the Sample 2 nanospheres.

The temperature-speed combinations at which friction began to decrease as speed decreased for the 1 wt. % Sample 1 nanosphere solution and the 1 wt. % Sample 2 nanosphere solution is provided in Table 3. Table 3 also shows the estimated film thickness of base oil (EXXON EHC45) at each of the temperature-speed combinations along with the core diameter (CD) and hydrodynamic diameter (HD) of the nanospherical components 10 (FIG. 1).

TABLE 3

| Nanosphere | Core Diameter | Hydrodynamic Diameter | Temperature-Speed Combination at which Friction Begins to Decrease at Low Speed | EHD Film Thickness of EHC45 at Critical Temperature-Speed Combination |
|---|---|---|---|---|
| Sample 1 | 20 nm | 45 nm | 75° C. – 100 mm/s | 25 nm |
| | | | 100° C. – 150 mm/s | 23 nm |
| | | | 125° C. – 150 mm/s | 17 nm |
| Sample 2 | 40 nm | 89 nm | 75° C. – 300 mm/s | 33 nm |
| | | | 100° C. – 500 mm/s | 32 nm |
| | | | 125° C. – 600 mm/s | 24 nm |

As shown in Table 3, the EHD film thickness of the base oil at the critical temperature-speed conditions was comparable or less than the core diameters of the nanospheres.

It is expected that formulations containing from about 0.5 to about 1.0 wt. % or more oil-soluble nanospherical components will enable a reduction in the amount of conventional phosphorus and sulfur antiwear agents needed thereby improving the performance of pollution control equipment on vehicles while achieving a similar or improved friction coefficient performance or benefit and little or no adverse effect on the corrosiveness of the oil.

EXAMPLE 5

Friction Coefficients of Nanospherical Components On Clutch Material

An evaluation of the friction coefficients for different clutch materials was made with the base oil and the base oil containing 1 wt. % of the Sample 2 nanospheres. The MTM was used to evaluate paper and carbon fiber friction plates at 100° C. under a load of 15 Newtons and at 10 mm/sec sliding speed. The results are contained in Table 4.

TABLE 4

| Sample Identification | Paper Friction Plates | Carbon Fiber Friction Plates |
|---|---|---|
| Base oil (EXXON EHC45) | 0.277 +/– 0.005 | 0.150 +/– 0.005 |
| Sample 2 in Base Oil (EXXON EHC45) | 0.180 +/– 0.005 | 0.130 +/– 0.005 |

EXAMPLE 6

Wear Data of Nanospherical Components On Steel

A comparison of the wear properties of the Sample 2 nanospheres (1 wt. %) in the base oil (EXXON EHC45) and conventional carbon-based nanospherical particles (1 wt. %) in the base oil was made using the HFRR at 120° C., 700 gram load, 20 Hz speed, 2 mm path over a period of 60 minutes. A wear scar formed on the HFRR disk during the course of the test. The depth of the resulting wear scar was measured after the test. The resulting wear scar data is contained in Table 5.

TABLE 5

| Sample Identification | Wear Scar Depth (microns) |
|---|---|
| Base oil (EXXON EHC45) | 1.17 |
| Carbon-based nanospheres in base oil (EXXON EHC 45) (1 wt.%) | 1.93 |
| Sample 2 nanospheres in base oil (EXXON EHC 45) (1 wt.%) | 0.97 |

As seen by the foregoing results, the wear data for the carbon-based nanospheres was worse than for the base oil, whereas, the Sample 2 nanospheres significantly improved the wear data relative to the base oil.

At numerous places throughout this specification has been made to a number of U.S. patents. All such cited documents are expressly incorporated in full into this disclosure as if fully set forth herein.

The foregoing embodiments are susceptible to considerable variation in its practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

What is claimed is:

1. A method for reducing a friction coefficient adjacent a lubricated surface, comprising providing an amount of an oil-soluble nanospherical component derived from a photo-crosslinkable poly(2-cinnamoyloxyalkyl acrylate) core and a diblock acrylate copolymer corona in a fully formulated lubricant composition containing a base oil of lubricating viscosity, and applying the lubricant composition containing the nanospherical component to a surface to be lubricated, wherein the nanospherical component has a core diameter ranging from about 10 to about 100 nanometers.

2. The method of claim 1, wherein the lubricated surface comprises an engine drive train.

3. The method of claim 1, wherein the lubricated surface comprises an internal surface or component of an internal combustion engine.

4. The method of claim 1, wherein the lubricated surface comprises an internal surface or component of a compression ignition engine.

5. The method of claim 1, wherein the amount of oil-soluble nanospherical component in the fully formulated lubricant composition ranges up to about 5 percent by weight.

6. The method of claim 1, wherein the amount of oil-soluble nanospherical component in the fully formulated lubricant composition ranges from about 0.1 to about 5 percent by weight.

7. The method of claim 1, wherein the amount of oil-soluble nanospherical component in the fully formulated lubricant composition ranges from about 0.5 to about 2 percent by weight.

8. The method of claim 1, wherein the nanospherical component has a hydrodynamic diameter ranging from about 10 to about 120 nanometers.

9. A method of reducing a friction coefficient of an engine lubricant composition during operation of an engine containing the lubricant composition, comprising contacting the engine parts with a fully formulated lubricant composition comprising a base oil of lubricating viscosity and an amount of an oil-soluble nanospherical component derived from a photo-crosslinkable poly(2-cinnamoyloxyalkyl acrylate) core and a diblock acrylate copolymer corona sufficient to reduce the friction coefficient to below a friction coefficient of a lubricant composition devoid of the oil-soluble nanopherical component, wherein the nanospherical component has a core diameter ranging from about 10 to about 100 nanometers.

10. The method of claim 9 wherein the engine comprises a heavy duty diesel engine.

11. The method of claim 9, wherein the amount of oil-soluble nanospherical component in the fully formulated lubricant composition ranges up to about 5 percent by weight.

12. The method of claim 9, wherein the amount of oil-soluble nanospherical component in the fully formulated lubricant composition ranges from about 0.5 to about 2 percent by weight.

13. The method of claim 9, wherein the nanospherical component has a hydrodynamic diameter ranging from about 10 to about 120 nanometers.

14. A method of for reducing wear between moving parts using a lubricating oil, the method comprising using as the lubricating oil for one or more moving parts a lubricant composition containing a base oil, and an oil additive package including a wear reducing agent, wherein the wear reducing agent comprises an oil-soluble nanospherical component derived from a photo-crosslinkable poly(2-cinnamoyloxyalkyl acrylate) core and a diblock acrylate copolymer corona.

15. The method of claim 14, wherein the moving parts comprise moving parts of an engine.

16. The method of claim 15, wherein the engine is selected from the group consisting of a compression ignition engine and a spark ignition engine.

17. The method of claim 15, wherein the engine includes an internal combustion engine having a crankcase and wherein the lubricating oil comprises a crankcase oil present in the crankcase of the engine.

18. The method of claim 15, wherein the lubricating oil comprises a drive train lubricant present in a drive train of a vehicle containing the engine.

19. The method of claim 15, wherein the wear reducing agent is present in the lubricant composition in an amount ranging up to about 5 percent by weight.

20. The method of claim 15, wherein the wear reducing agent is present in the lubricant composition in an amount ranging from about 0.1 to about 5 percent by weight.

21. The method of claim 15, wherein the wear reducing agent is present in the lubricant composition in an amount ranging from about 0.5 to about 2 percent by weight.

22. The method of claim 15, wherein the core of the nanospherical component has a diameter ranging from about 10 to about 100 nanometers.

23. The method of claim 15, wherein the nanospherical component has a hydrodynamic diameter ranging from about 20 to about 120 nanometers.

24. A method for reducing a friction coefficient adjacent a lubricated surface, comprising providing an amount of an oil-soluble nanospherical component derived from a photo-crosslinkable poly(2-cinnamoyloxyalkyl acrylate) core and a diblock acrylate copolymer corona in a fully formulated lubricant composition containing a base oil of lubricating viscosity, and applying the lubricant composition containing the nanospherical component to a surface to be lubricated, wherein the nanospherical component has a core diameter greater than the film thickness of the lubricant composition.

25. A method of reducing a friction coefficient of an engine lubricant composition during operation of an engine containing the lubricant composition, comprising contacting the engine parts with a fully formulated lubricant composition comprising a base oil of lubricating viscosity and an amount of an oil-soluble nanospherical component derived from a photo-crosslinkable poly(2-cinnamoyloxyalkyl acrylate) core and a diblock acrylate copolymer corona sufficient to reduce the friction coefficient to below a friction coefficient of a lubricant composition devoid of the oil-soluble nanospherical component, wherein the nanospherical component has a core diameter greater than the film thickness of the lubricant composition.

\* \* \* \* \*

UNITED STATES PATENT AND TRADEMARK OFFICE
CERTIFICATE OF CORRECTION

PATENT NO. : 7,632,788 B2  
APPLICATION NO. : 11/301229  
DATED : December 15, 2009  
INVENTOR(S) : Jao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 934 days.

Signed and Sealed this

Second Day of November, 2010

David J. Kappos  
*Director of the United States Patent and Trademark Office*